United States Patent
Hornung

[11] 3,848,168
[45] Nov. 12, 1974

[54] SPEED CONTROL SYSTEM FOR A-C SUPPLIED UNIVERSAL MOTORS

[75] Inventor: Friedrich Hornung, Stuttgart, Germany

[73] Assignee: Robert Bosch GmbH, Gerlingen-Schillerhohe, Germany

[22] Filed: May 3, 1973

[21] Appl. No.: 356,968

[30] Foreign Application Priority Data
June 19, 1972 Germany.............................. 2229694

[52] U.S. Cl...................... 318/331, 317/5, 318/345
[51] Int. Cl. ............................................. H02p 7/62
[58] Field of Search ........ 318/331, 345, 227; 323/4, 323/22 R, 34; 317/5

[56] References Cited
UNITED STATES PATENTS
3,588,647  6/1971  Harwell.............................. 318/345

Primary Examiner—J. D. Miller
Assistant Examiner—Harry E. Moose, Jr.
Attorney, Agent, or Firm—Flynn & Frishauf

[57] ABSTRACT

A double polar thyristor, such as a Triac is connected in series with the universal motor. The Triac is triggered by two independently operating trigger circuits. One trigger circuit operates at a phase angle $\phi 1$, between 70° to 110°, preferably about 90°. The second trigger circuit permits passage of current through a much larger phase angle $\phi 2$, for example 180°. Load on the motor is sensed by sensing commutating pulses, and when the commutating pulses exceed predetermined values, the second trigger circuit is enabled. The motor, thus, under no-load conditions, will be triggered only by the first trigger circuit, the second trigger circuit becoming effective, for selected statistically distributed half wave pulses as the load on the motor increases, the statistical distribution, in time, of the trigger pulses from the second circuit (providing, preferably, full wave application of power to the motor) occurring in accordance with loading on the motor.

14 Claims, 6 Drawing Figures

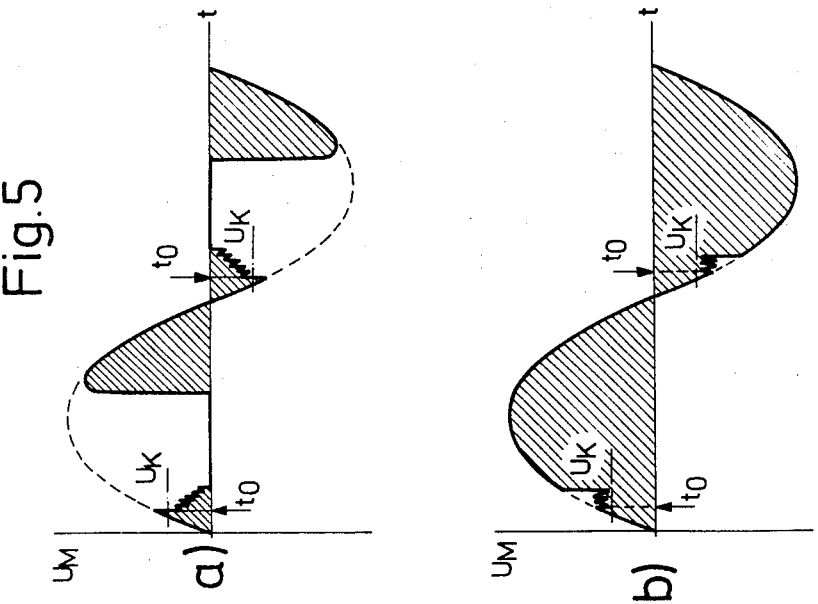
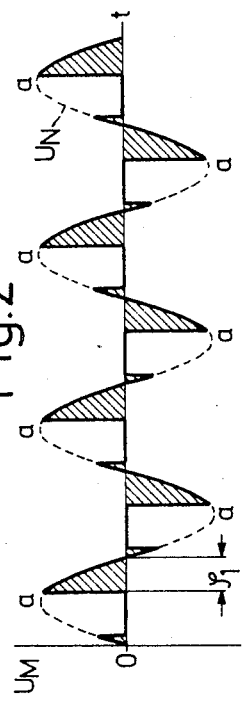
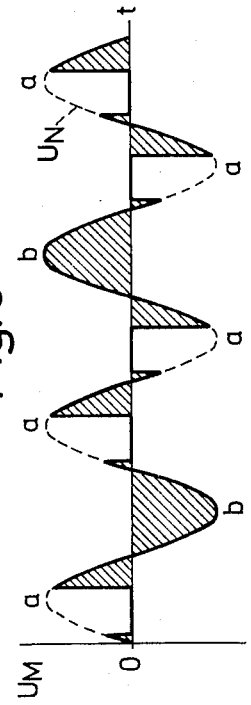
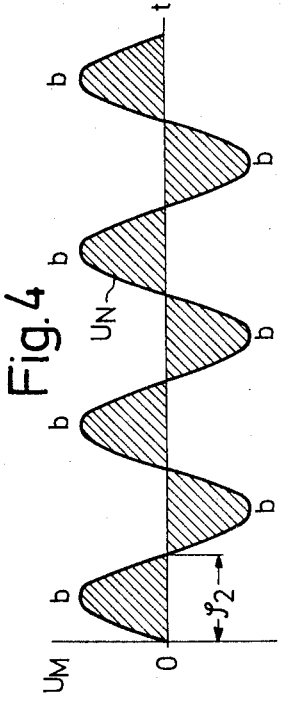

SPEED CONTROL SYSTEM FOR A-C SUPPLIED UNIVERSAL MOTORS

The present invention relates to a speed control system for electric universal series wound motors, and particularly for motors of this type which are used for electric tools to be supplied from single-phase alternating current networks.

Fractional horse power motors, particularly motors for power tools and the like and wound as series wound motors, designed for connecting to single-phase a-c lines have high no-load speeds. As the motor is loaded, the speed drops rapidly.

It is an object of the present invention to provide a speed control circuit which is simple, utilizes but few components, and which is arranged to provide a torque-speed curve which is substantially flat, so that, at least under no-load or partial load conditions, the speed of the motor is not substantially higher than when the motor approaches full load.

Subject matter of the present invention: Briefly, the controller for the motor is of the on-off type, controlling, selectively, conduction of a bipolar thyristor, such as a Triac, located in the load circuit of the motor. Under no-load conditions, the Triac is triggered from a first trigger circuit at a phase angle $\phi 1$ which, for example, may be in the range of about 70° to 110°. As the loading increases, the motor is triggered at a second phase angle $\phi 2$, which is greater than $\phi 1$, for example 180°. The distribution of trigger pulses of the second or greater phase angle is controlled in dependence on loading on the motor, for example by sensing commutation pulses from the motor. The statistical distribution of trigger pulses for the Triac to control the Triac to conduct during the second phase angle, for example to provide for full wave conduction, will depend on the loading on the motor. The phase angles, themselves, may be pre-set in the circuit.

Experiments have shown that the phase angle $\phi 1$ preferably is about 90°. The phase angle $\phi 2$ is selected to be approximately 180°. The bilateral thyristor is preferably controlled by two separate control circuits, one each for the phase angle $\phi 1$, $\phi 2$. The first control circuit, providing trigger pulses at the phase angle $\phi 1$ is preferably an R/C circuit connected to an electrode of the trigger of the Triac. The control circuit to provide current at the second phase angle $\phi 2$ is preferably connected in parallel to the first control circuit and likewise includes an R/C circuit. It is triggered by a series circuit formed of a resistor and a capacitor to sense pulses due to higher frequency commutating currents, which are applied to trigger a breakdown diode and permit transfer of control pulses at the second phase angle to the Triac. The circuit, in comparison to known circuits, utilizes only inexpensive, reliable solid-state components and is cheap and simple to construct, and additionally can be small and located anywhere within the motor housing or a handle for an electric tool. The controlling effect is excellent, and the controller only requires electrical connection to the motor, so that it can be located remotely from the motor, for example in the handle, a housing, or a support, or other convenient locations with respect to the motor.

The controller in accordance with the present invention is of the on-off type, and, contrary to analog or constantly variable controllers, sensitive to commutating voltages at the motor occurring during current break intervals during commutation.

Some of the resistors of the R/C circuits can be made adjustable, or pre-settable, so that the angular relationships of the phase angles can be adjusted or changed. This permits pre-setting or adjustment of no-load speed, for example, thus slowing the acceleration rate of the motor from stop condition.

Suitable triggers are bi-directional, or bipolar diodes, also known as Diacs. These elements are small, light, inexpensive and provide high operating reliability.

The invention will be described by way of example with reference to the accompanying drawings, wherein:

FIGS. 2, 3 and 4 are time graphs of motor voltage with respect to time, under increasing load condition, FIG. 2 illustrating no-load condition, FIG. 3 illustrating partially loaded condition, and FIG. 4 illustrating full-load condition;

FIG. 5 is a composite diagram illustrating motor voltage, with respect to time, line (a) indicating no-load motor voltage and line (b) illustrating full-load motor voltage.

Figure 1:
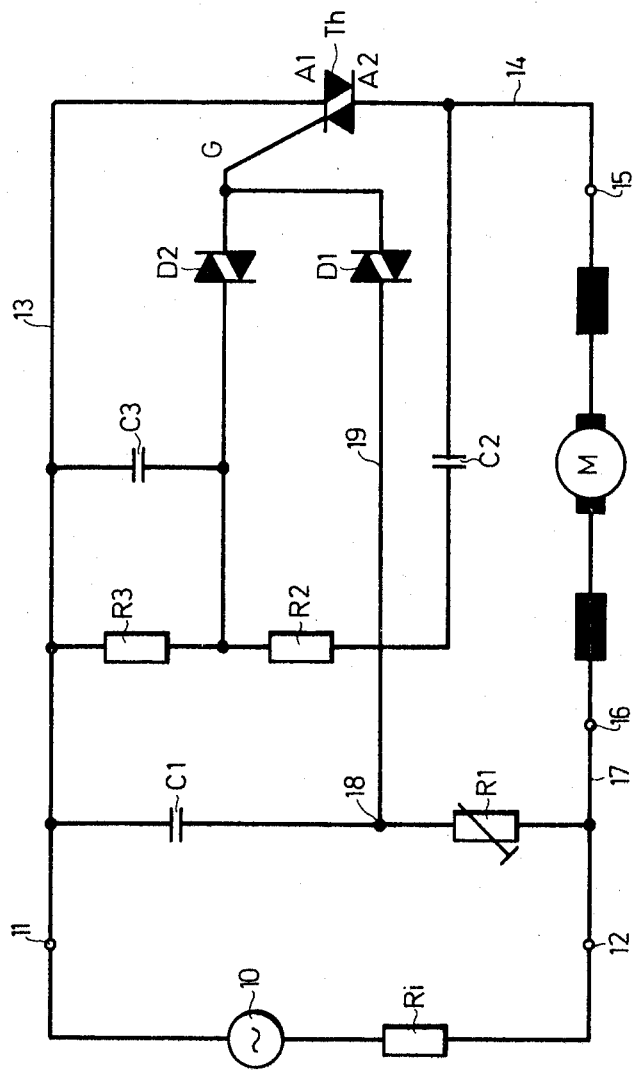
FIG. 1 is a schematic circuit diagram of the speed control system.

A single-phase current source 10, with internal resistance $R_i$ (which is extremely low) is connected to connection terminals 11, 12, to which the motor is to be connected. Terminal 11 is connected to a line 13 which connects to terminal A1 of a bi-directional, or bipolar thyristor, or Triac Th, the other main terminal of which is indicated by A2. The gate terminal of the Triac Th is shown at G. Terminal A2 of Triac Th connects over line 14 to a terminal 15 of a universal motor M. The other terminal 16 of motor M is connected to line 17 and back to the a-c voltage supply terminal 12.

Connected across lines 13, 17, that is, in parallel to a-c source 10, is the series circuit formed of a capacitor C1 and a resistor R1, which is preferably of variable or adjustable value. Terminal 18, forming the junction between capacitor C1 and resistor R1 is connected to line 19 which connects to one terminal of a first trigger diode D1. The trigger diode D1 is bidirectional, that is, is a Diac. The other electrode from the Diac D1 is connected to the gate electrode G of the Triac Th.

The gate electrode G of the Triac Th can additionally be triggered upon conduction of a second Diac D2. The second Diac D2 likewise is controlled by an R/C circuit formed of a resistor R3 and a capacitor C3, connected to line 13. The other side of the R/C circuit is connected to a series circuit formed of resistor R2 and capacitor C2, which is connected in turn to line 14.

Figure 6:
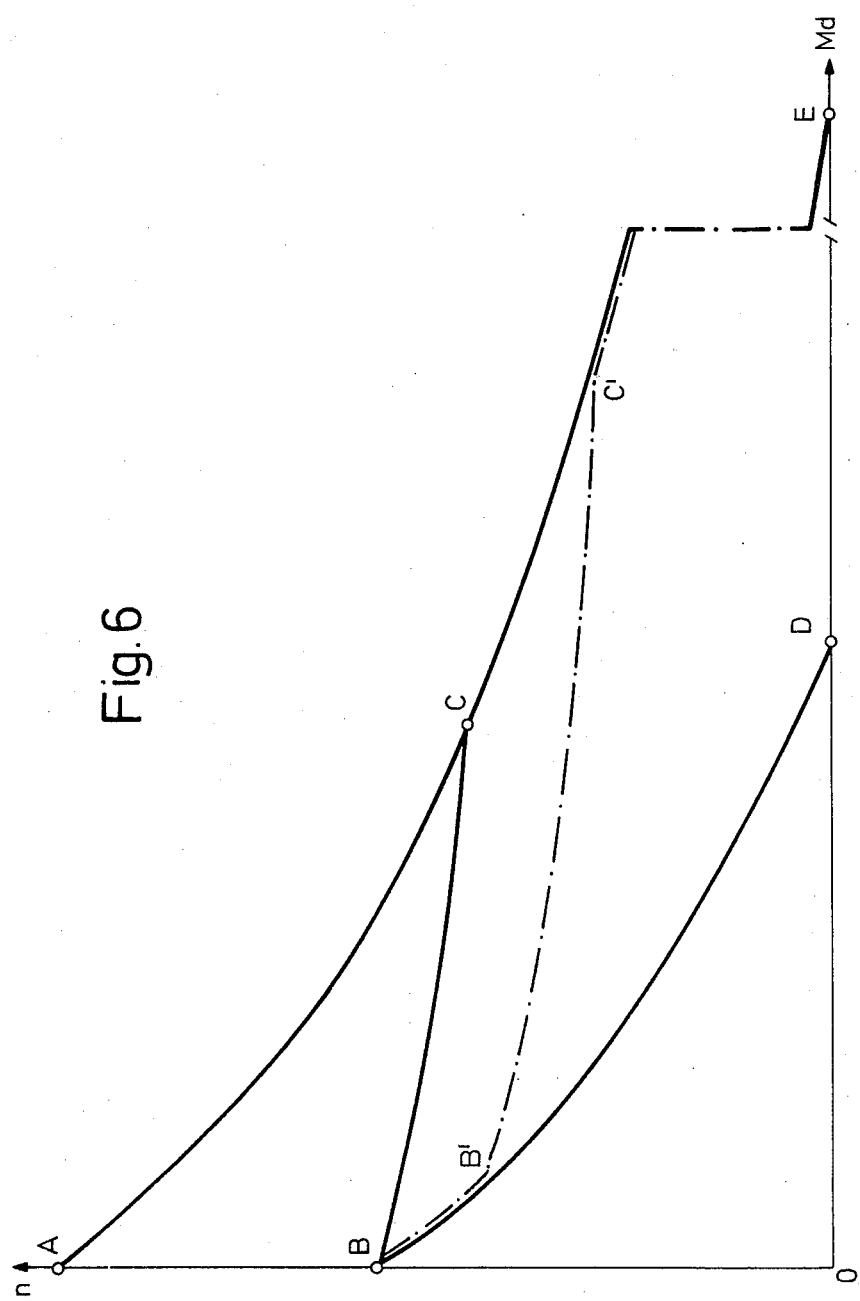
FIG. 6 is a diagram of operating characteristics of a universal-type motor, under controlled and uncontrolled conditions, in which the abscissa represents torque and the ordinate represents motor shaft speed.

Before considering operation of the circuit, the purpose and object of the circuit will be explained in connection with FIG. 6, to which reference is now made.

The normal, uncontrolled speed-torque characteristic of a universal motor is indicated by the curve A-C-E. Torque, as indicated on the abscissa Md drops as the speed decreases. The disadvantage of such a series motor is the substantial drop in speed in the region between A-C, that is, the high speed under no-load condition. As soon as only slight loading is placed on the motor, speed drops rapidly. The high speed at no-load cannot be effectively utilized. In the region C-E a satisfactory uniformity of speed n with respect to torque Md is obtained. The motor is, however, operated in part, or wholly, under overload conditions, which effectively prevents use of the motor for longer periods of time under high loading, or requires special insulation and cooling. If the high no-load speed is dropped, by dropping operating voltage, then a curve B-D is obtained. As can be seen from FIG. 6, the decrease in speed upon loading is pronounced.

The effect of the present controller on the operation of the motor is illustrated by the curve B-C. Initially, the motor is operated with decreased voltage, that is, to obtain a no-load speed corresponding to point B. As the loading increases, the controller increases the effective motor voltage, increasing torque. The increasing voltage counteracts, however, the drop in torque, so that the actual characteristic which will be obtained will follow the line B-C. Speed of the motor, with respect to torque, drops only slightly, and is sufficient particularly for most fractional horse power applications, for example electric hand tool, small drills, household appliances or the like. At point C, the controller has increased motor voltage to nominal terminal value at the line terminals 11, 12 (FIG. 1) and the characteristic will then follow the curve C-E, without further control by the controller. The motor, and the controller are so designed that nominal power, that is maximum horse power (torque times speed) is within the region C-E, for example just beyond point C.

Controller action, with reference to FIGS. 2–4 and 5: Under no-load condition, the controller reduces applied motor voltage $U_M$ from between 30 to 80 percent, preferably from between 60 to 70 percent of the nominal voltage delivered by a-c source 10, by fixed phase control of the source. The motor receives only substantially reduced half waves a. As seen in FIG. 3, the controller adds to the portions a, from time to time, and depending on loading, full half-wave portions B. This increases the effective value of the motor voltage $U_M$. As the loading increases, more and more partial half-waves a are replaced by full half-waves until, finally, the voltage applied to the motor $U_M$ is equal to that supplied from the a-c source 10, at nominal value, that is, motor M is completely supplied by full half-waves at each half cycle, as seen in FIG. 4 at b. At the respective torque, the motor will have reached maximum speed corresponding to point C of FIG. 6. The controller operates in such a manner that partially suppressed half-waves, or full half-waves are supplied to the motor. The phase angle $\phi$ of the half waves supplied to the motor is not changed gradually; rather, the phase angle is either a lower value, $\phi_1$, typically 90°, or the higher value $\phi_2$, typically 180°. The controller, thus, operates on the on-off principle, switching between fixed values. The recurrence of switching from partial phase $\phi_1$ to full phase $\phi_2$, over a group of half-waves depends, however, on the loading on the motor.

Operation of the circuit, with reference to FIG. 1: The Triac Th is fired by two separate control circuits. The first control circuit is the trigger Diac D1, and R/C circuit R1, C1. It triggers Triac Th independently of the state of loading on the motor, and provides the phased half-waves a of FIGS. 2 and 5. The ignition timing, that is the current flow angle $\phi_1$ is determined by the relative values of R1 and C1, that is, in the present instance by the adjustment setting of the adjustable resistor R1. Under no-load condition, the first control circuit is primarily effective to control the motor and the motor voltage $U_M$ will have the wave shape as indicated in FIG. 2. At the beginning of each positive and each negative half-wave, there will be a noticeable phase shift, with respect to zero or null value, that is, with respect to changing from positive to negative potential, between motor voltage and motor current. This phase shift is the result of motor inductance. At the time current passes through zero, the voltage applied to the motor already has a small positive, or negative value.

The second control circuit includes the R/C circuit R2, C2, another R/C circuit R3, C3, and the trigger element D2. The trigger Diac D2 triggers the Triac Th in dependence on a control value derived over capacitor C2. The control value utilized is the commutating pulse appearing at the motor and arising during interruption of current flow through the motor. The relationships are illustrated in greatly enlarged scale in FIG. 5, graphs (a) for no-load condition and (b) for full-load condition. In a universal motor, commutating pulses arise immediately after the Triac has ceased conduction, that is immediately after turn-off of the Triac after each half-wave. Thus, after the voltage applied to the motor, at each half-wave, has ceased, commutating pulses of a predetermined amplitude will arise. The amplitude of the commutating pulses will depend on the loading on the motor. The instant at which the current passes through zero is indicated by time $t_0$ in graphs (a) and (b) of FIG. 5, which illustrates voltage relationships. The level of the switching threshold $U_K$, to effect triggering of the Triac Th by the second control circuit depends on the breakdown voltage, or triggering voltage of the Diac trigger element D2, and the relative values of capacity and resistance of the networks R2/C2 and R3/C3. These relative values are so adjusted that, when the motor is operating under no-load conditions, the pulse peaks arising upon commutation, that is, after the time $t_0$ just do not meet the switching threshold of the Diac. Thus, under no-load condition, the Triac Th will not be fired at the beginning of each half-wave. This relationship is indicated in graph (a) of FIG. 5. As the loading of the motor increases, the commutating pulses will increase in amplitude and the switching threshold Uk will be exceeded. The Diac D2 will be triggered, and Triac Th will fire immediately after current reversal, that is, immediately after the time $t_0$. The motor will receive a full half-wave as operating voltage, thus increasing the motor speed. The voltage relationship under this condition is indicated in graph (b) of FIG. 5.

The series connection of resistors R3, R2 and capacitor C2 is so dimensioned that, at power line frequency, for example 60 Hz, the current through capacitor C2 is sufficiently small, and the voltage which then results at the parallel circuit of R3 and C3 can be neglected with respect to the firing potential of the trigger voltage of Diac D2. This condition will pertain so long as the loading on the motor is small, that is, for example under no-load condition. The current peaks due to commutation have low amplitude, so that they cannot influence firing of the Triac Th. The Triac Th is then fired only in dependence on the relative values of R1/C1, that is, at the fixed phase angle $\phi_1$.

As the loading of the motor increases, voltage pulses due to commutation of the armature, particularly the first pulse after time $t_0$ (FIG. 5) will have an amplitude which is sufficient to charge capacitor C3 to the breakdown voltage of the trigger element D2, and thus to the trigger voltage of the Triac Th. The control circuit with the circuit elements C2, R2; R3 and C3 are in parallel to the series connection formed by the motor and the external current source with the practically neglectable low resistance network impedance $R_i$. The control circuit is closed over the network impedance $R_i$. The level of charge on capacitor C3 is determined primarily by the first commutating pulse, that is, by the first pulse occurring immediately after time $t_0$. If the level of this pulse is insufficient to charge capacitor C3 to the breakdown voltage of the trigger element D2, capacitor C2 discharges immediately and ignition of the Triac Th will be controlled solely by the first trigger network R1/C1 and D1, that is, for the fixed phase angle $\phi 1$, determined by the relative values of R1/C1. The statistic distribution of full half-waves $b$ with respect to partial half-waves $a$, illustrated in FIG. 3, at a certain torque or loading Md is determined by the level of commutating pulses, arising due to the turn-off transients between the brushes and the commutator bars. These specific transients are practically undefinable and, themselves, subject to statistic distribution, in time.

The commutating pulse levels are utilized to directly control the Triac Th over the second control circuit. The resulting function of the controller is an on-off control cycle between partial phase supply, that is supply by phase $\phi 1$, and full phase supply, that is supply by phase $\phi 2$, the relative recurrence of full phases being determined by loading on the motor. This on-off control results in a particularly simple electronic circuit, utilizing only few elements while providing effective regulation comparable to much more complicated circuits.

Typical values for a 50 Hz series wound 0,5 hp motor of 220 V nominal voltage are:

Th, maximum current 4,5 A at 400 V
D1, 32 V breakover voltage
D2, 20 V breakover voltage
C1 0,047 $\mu$F
R1 100 K Ohms to 1 M Ohm
C2 0,022 $\mu$F
R2 3.9 K Ohms
C3 0,022 $\mu$F
R3 6,8 K Ohms Various changes and modifications may be made within the scope of the inventive concept.

Adjustable load-speed control can be obtained by making R3 adjustable. Changing the resistance of the network R3, R2, C2, changes the peak levels transferred to Diac D2 to trigger the Diac; thus, the statistical distribution of full-wave pulses b (FIG. 3) with respect to the half-wave pulses a can be modified, and thus the inclination of the curve B-C (FIG. 6) can be controlled, thus providing a measure of speed control given a predetermined torque demanded from the motor. Adjusting resistor R1 changes the phase angle $\phi 1$, and thus the no-load speed of the motor. Thus a curve e.g. like curve B' C' (FIG. 6) can be obtained.

I claim:

1. Speed control system for a-c supplied series wound commutator universal motors (M) comprising:

controllable semiconductor switching means (Th) connectable for each half phase of the a-c supplied to the motor;

means triggering said switching means (Th) selectively at a first fixed, preset phase angle ($\phi 1$) or at a second fixed, preset phase angle ($\phi 2$), wherein said second phase angle is greater than said first phase angle ($\phi 2 > \phi 1$);

and means connected to the motor and sensitive to motor loading, controlling said triggering means to trigger said semiconductor switching means, selectively, at said first preset phase angle ($\phi 1$) or said second preset phase angle ($\phi 2$), to provide trigger pulses to the controllable semiconductor switching means (Th), statistically distributed, in time, in accordance with loading on the motor.

2. System according to claim 1, wherein said trigger means comprises a pair of parallel circuits, one circuit including a first phase angle sensitive means (D1, C1, R1), sensitive to said first phase angle ($\phi 1$) of the a-c supply and connected to trigger the controllable semiconductor switching means to connect the a-c supply to the motor at said first preset phase angle at each half-wave, to provide an average voltage thereto which determines the no-load speed thereof;

and second phase angle sensitive means (D2, C2, R2, C3, R3) sensitive to the second preset phase angle ($\phi 2$) of the a-c supply and adapted to trigger the controllable semiconductor switching means to connect the a-c supply, at said second phase angle, the motor loading sensing means being connected to the motor to sense loading on the motor and connected to control said second phase angle sensitive means to be rendered effective to provide trigger pulses to the controllable semiconductor switching means (Th), statistically distributed, in time, in accordance with loading on the motor.

3. System according to claim 1, wherein the first phase angle ($\phi 1$) is between 70° to 110°.

4. System according to claim 3, wherein the first phase angle is about 90°.

5. System according to claim 1, wherein the second phase angle ($\phi 2$) is about 180°.

6. System according to claim 1, wherein the controllable semiconductor switching means comprises a bidirectional thyristor, or Triac (Th).

7. System according to claim 2, wherein the controllable semiconductor switching element comprises a bi-directional thyristor or Triac (Th), having its gate electrode connected to both said first and second phase angle sensitive means, each said phase angle sensitive means forming a control circuit for the gate electrode of said thyristor or Triac, and controlling conduction of the thyristor either during the lesser, or greater one of the phase angles ($\phi 1$, $\phi 2$).

8. System according to claim 7, wherein the first phase angle sensitive means forming the first control circuit comprises a series circuit including a capacitor (C1) and a resistor (R1), connected across the a-c voltage supply; a trigger element (D1) having one electrode connected to the junction of said resistor and capacitor, and its other electrode to the gate electrode (G) of the bi-directional thyristor or Triac (Th).

9. System according to claim 8, wherein the resistor is adjustable, in order to adjust the no-load speed of the motor.

10. System according to claim 7, wherein the second phase angle sensitive means forming the second control circuit and sensitive to the second phase angle ($\phi 2$) is connected in parallel to the series circuit formed of the a-c supply source and the motor, and comprises a series circuit including:

resistance means (R2, R3) and a capacitor (C2) to isolate the supply voltage from said control circuit;

a parallel circuit comprising a resistor (R3) and a capacitor (C3) and connected in series with the series circuit formed of said resistance means and said first capacitor (C2); and a trigger element (D2) connected to sense the voltage across the resistor (R3) due to high-frequency commutating currents transferred to said resistor by the series circuit formed of the resistance means and the capacitor (C2), said trigger element transferring trigger pulses to the thyristor or Triac (Th) when the voltage across said resistor (R3) exceeds the triggering voltage of said trigger element.

11. System according to claim 9, wherein the trigger element is a Diac, or bi-directional diode (D1).

12. System according to claim 10, wherein the trigger element is a Diac or bi-directional diode (D2).

13. Universal motor and speed control system combination, adapted for connection to an a-c supply comprising:

controllable switching means (Th) connected to apply each half-wave of the a-c supply to the motor;

means deriving a sensing voltage from the commutating pulses arising at the motor;

means controlling said semiconductor switching element to supply a-c power to said motor at a first phase angle at all times while the motor is connected to said source of supply;

means supplying a-c power to said motor at a second phase angle which is greater than said first phase angle;

and means enabling connection of said second phase angle supply means to said motor when commutating pulses in excess of a predetermined level are sensed whereby power, at said second and greater phase angle is applied to said motor upon increase in loading on the motor.

14. Combination according to claim 13, wherein the lower phase angle is set to be between 70° to 110°; and the higher phase angle is set to be about 180°, to supply full-wave power to the motor if the second phase angle controls application of power to the motor.

* * * * *